(12) United States Patent
Takahashi (10) Patent No.: US 9,031,755 B2
(45) Date of Patent: May 12, 2015

(54) BRAKE CONTROL DEVICE AND BRAKE CONTROL METHOD

(75) Inventor: Hiroyuki Takahashi, Miyoshi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 178 days.

(21) Appl. No.: 13/395,034

(22) PCT Filed: Apr. 6, 2011

(86) PCT No.: PCT/JP2011/058732
§ 371 (c)(1),
(2), (4) Date: Mar. 8, 2012

(87) PCT Pub. No.: WO2012/137326
PCT Pub. Date: Oct. 11, 2012

(65) Prior Publication Data
US 2012/0259525 A1 Oct. 11, 2012

(51) Int. Cl.
*B60T 8/17* (2006.01)
*B60T 7/12* (2006.01)
*B60T 7/22* (2006.01)
*B60W 10/06* (2006.01)
*B60W 10/18* (2012.01)
*B60W 30/09* (2012.01)

(52) U.S. Cl.
CPC .............. *B60T 7/22* (2013.01); *B60T 2201/022* (2013.01); *B60W 10/06* (2013.01); *B60W 10/18* (2013.01); *B60W 30/09* (2013.01); *B60W 2550/30* (2013.01); *B60W 2550/302* (2013.01); *B60W 2550/306* (2013.01); *B60W 2550/308* (2013.01)

(58) Field of Classification Search
USPC .................. 701/1, 23, 46, 48, 53, 70, 96, 301
See application file for complete search history.

(56) References Cited

U.S. PATENT DOCUMENTS

| | | | |
|---|---|---|---|
| 2005/0225170 A1* | 10/2005 | Tsunehara | 303/155 |
| 2008/0312834 A1* | 12/2008 | Noda et al. | 701/301 |
| 2009/0026987 A1* | 1/2009 | Takahashi | 318/376 |

FOREIGN PATENT DOCUMENTS

| | | |
|---|---|---|
| CN | 101395030 A | 3/2009 |
| CN | 201424012 Y | 3/2010 |
| JP | 2003-054394 A | 2/2003 |
| JP | 2004-164189 A | 6/2004 |
| JP | 2005-263026 A | 9/2005 |
| JP | 2007-062604 A | 3/2007 |
| JP | 2007-245835 A | 9/2007 |
| JP | 2008-285095 A | 11/2008 |

* cited by examiner

*Primary Examiner* — Redhwan K Mawari
*Assistant Examiner* — Rodney P King
(74) *Attorney, Agent, or Firm* — Sughrue Mion, PLLC (57) ABSTRACT

A PCS ECU 20 in a PCS system 10 calculates TTC which is a brake operation timing of a host vehicle, on the basis of the relative velocity Vr between the host vehicle and an object, a predetermined deceleration amount ΔV caused by a brake operation of the host vehicle, and a deceleration a caused by the brake operation of the host vehicle. Thereby, the deceleration amount ΔV caused by the brake operation of the host vehicle is to be a set constant amount regardless of the relative velocity Vr between the host vehicle and the object. Accordingly, it is possible to ensure the deceleration amount ΔV caused by a more appropriate brake operation.

8 Claims, 6 Drawing Sheets

Fig.6

BRAKE CONTROL DEVICE AND BRAKE CONTROL METHOD

CROSS REFERENCE TO RELATED APPLICATION

This Application is a National Stage of International Application No. PCT/JP2011/058732, filed Apr. 6, 2011, the contents of all of which are incorporated herein by reference in their entirety.

TECHNICAL FIELD

The present invention relates to a brake control device and a brake control method, and more specifically relates to a brake control device that calculates the timing of the brake operation of a host vehicle.

BACKGROUND ART

In order to enhance vehicular safety, devices that operate the brake of a host vehicle at a calculated timing have been proposed. For example, Patent Literature 1 discloses a vehicle equipped with one or more safety devices that operate when it is determined that the collision between a host vehicle and a collision object is inevitable. In the vehicle, the extent of damage which the host vehicle will receive due to the collision with a collision object is estimated on the basis of information acquired by a radar device and an image capturing device included in the vehicle, and pre-crash safety controls of the safety device are optimized according to the estimated extent of damage.

CITATION LIST

Patent Literature

Patent Literature 1: Japanese Published Patent Application No. 2005-263026

SUMMARY OF INVENTION

Technical Problem

However, in the above-mentioned technique, there is room for improvement in that there is a need for ensuring an appropriate variation in velocity caused by a brake operation regardless of a variety of circumstances.

The present invention is contrived in view of such circumstances, and an object thereof is to provide a brake control device and a brake control method capable of securing a variation in velocity caused by a more appropriate brake operation.

Solution to Problem

In an aspect of the present invention, there is provided a brake control device including a brake operation timing calculating unit that calculates a timing of the brake operation of a host vehicle, on the basis of the relative velocity between the host vehicle and an object, a predetermined variation in velocity caused by a brake operation of the host vehicle and a deceleration caused by the brake operation of the host vehicle.

According to this configuration, the brake operation timing calculating unit of the brake control device calculates the timing of the brake operation of the host vehicle, on the basis of the relative velocity between the host vehicle and the object, the predetermined variation in velocity caused by the brake operation of the host vehicle, and the deceleration caused by the brake operation of the host vehicle. Thereby, the variation in velocity caused by the brake operation of the host vehicle is to be a set constant regardless of the relative velocity between the host and the object. Accordingly, it is possible to secure the variation in velocity caused by a more appropriate brake operation.

In this case, when the relative velocity is equal to or lower than the set variation in velocity, the brake operation timing calculating unit may calculate the brake operation timing of the host vehicle, on the basis of the relative velocity and the deceleration.

According to this configuration, when the relative velocity is equal to or lower than the set variation in velocity, the brake operation timing calculating unit calculates the brake operation timing of the host vehicle, on the basis of the relative velocity and the deceleration. Thereby, when the relative velocity between the host and the object is equal to or lower than the set variation in velocity caused by the brake operation of the host vehicle, the deceleration of the host vehicle is accomplished by the deceleration of that relative velocity amount. Thereby, it is possible to suppress an unnecessary deceleration.

In addition, the brake operation timing calculating unit may calculate the brake operation timing of the host vehicle, on the basis of t an acceleration and a deceleration of the object.

According to this configuration, the brake operation timing calculating unit calculates the brake operation timing of the host vehicle, on the basis of an acceleration and a deceleration of the object. Thereby, it is possible to secure the variation in velocity caused by a more appropriate brake operation.

In addition, the brake operation timing calculating unit may calculate the brake operation timing of the host vehicle, on the basis of a predetermined delay time in a system of the host vehicle.

According to this configuration, the brake operation timing calculating unit calculates the brake operation timing of the host vehicle, on the basis of the predetermined delay time in a system of the host vehicle. Thereby, it is possible to secure a more appropriate brake operation timing of the host vehicle and the variation in velocity caused by a more appropriate brake operation.

In another aspect of the present invention, there is provided a brake control method, including a brake operation timing calculating process of calculating a brake operation timing of a host vehicle, on the basis of the relative velocity between the host vehicle and an object, a preset variation in velocity caused by a brake operation of the host vehicle, and a deceleration caused by the brake operation of the host vehicle.

Advantageous Effects of Invention

In accordance with a brake control device and a brake control method of the present invention, it is possible to secure a variation in velocity caused by a more appropriate brake operation.

DESCRIPTION OF EMBODIMENTS

Figure 1:
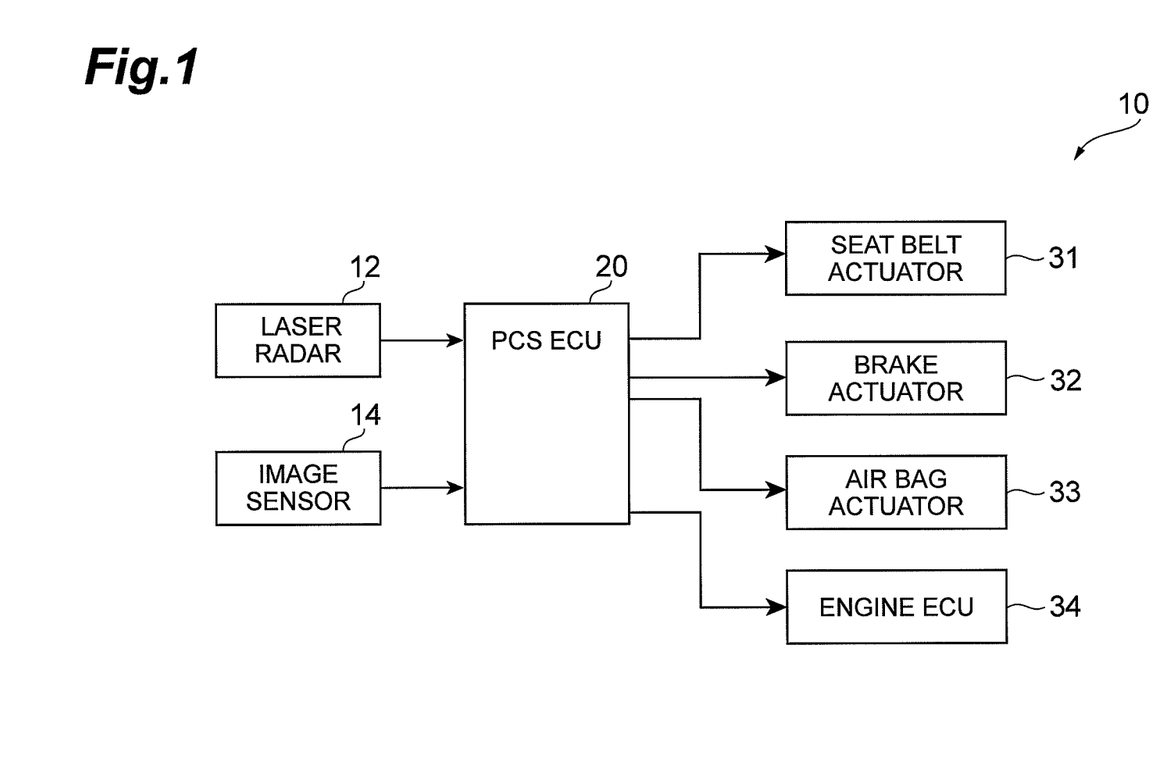
FIG. 1 is a block diagram illustrating the configuration of a PCS system according to an embodiment of the present invention.

Hereinafter, a brake control device according to an embodiment of the present invention will be described with reference to the drawings. The brake control device according to the present embodiment includes a PCS (Pre-Crush Safety) system that operates the brake of a host vehicle at a calculated timing with respect to objects such as other vehicles or roadside structures. As shown in FIG. 1, a PCS system 10 according to the present embodiment includes a laser radar 12, an image sensor 14, a PCS ECU 20, a seat belt actuator 31, a brake actuator 32, an air bag actuator 33 and an engine ECU 34.

The laser radar 12 measures positions, distances and relative velocities of obstacles, such as other vehicles and the like serving as objects ahead of a host vehicle. The image sensor 14 is composed of a CMOS camera or a CCD camera, picks up images of the objects ahead of the host vehicle, and detects the conditions of the objects. Meanwhile, in addition to the laser radar 12, other means such as a stereo camera may be used as means for measuring the positional relationship, the velocity relationship and the like between the host vehicle and the objects. As described in detail later, the PCS ECU 20 determines the possibility of contact and the timing thereof from information such as the relative velocity between the host vehicle and the objects obtained from the laser radar 12 or the image sensor 14, and controls the operations of various safety devices such as the brake actuator 32 and the like.

The seat belt actuator 31 increases the tension of a seat belt to enhance the safety of a driver by a command signal of the PCS ECU 20, in a case where there is a possibility of contact. The brake actuator 32 decelerates the velocity of a host vehicle at a timing calculated by the PCS ECU 20 depending on the circumstances. The air bag actuator 33 expands air bags to enhance the safety of the driver according to the command signal of PCS ECU 20, in a case where there is a possibility of contact. The engine ECU 34 controls the engine of the host vehicle by the command signal of the PCS ECU 20.

Hereinafter, operations of the PCS system 10 according to the present embodiment will be described. First, the problem of an existing system according to the inventor's knowledge will be described. Here, it is assumed that TTC (Time To Collision) that is the time taken for a host vehicle to collide with an object is the same as the existing system and the brake is similarly operated. In this case, the relationship between the relative velocity of the object and the host vehicle and the variation in velocity (deceleration amount) of the host vehicle caused by the brake is as follows: the higher the relative velocity, the smaller the deceleration amount till the collision becomes.

For example, when the distance to an object in a brake operation is set to D, the following Expression (1) is established as the definition of TTC.

[Expression 1]

$$D = Vr \times TTC \qquad (1)$$

Here, Vr is the relative velocity between the object and the host vehicle during the brake operation. Assuming that a set acceleration a (deceleration when it has a negative value) generated by the brake operation is a step response and the time to the collision is set to t, the following Expression (2) is established.

[Formula 2]

$$\frac{1}{2}at^2 + Vrt = D \qquad (2)$$

By obtaining the relationship between t and Vr from the expressions (1) and (2), the following expression (3) is established.

[Formula 3]

$$t = \frac{-2Vr + \sqrt{4Vr^2 + 8aVrTTC}}{2a} \qquad (3)$$

The deceleration amount ΔV to the collision is as shown in the following expression (4).

[Formula 4]

$$\Delta V = at \qquad (4)$$

Figure 2:
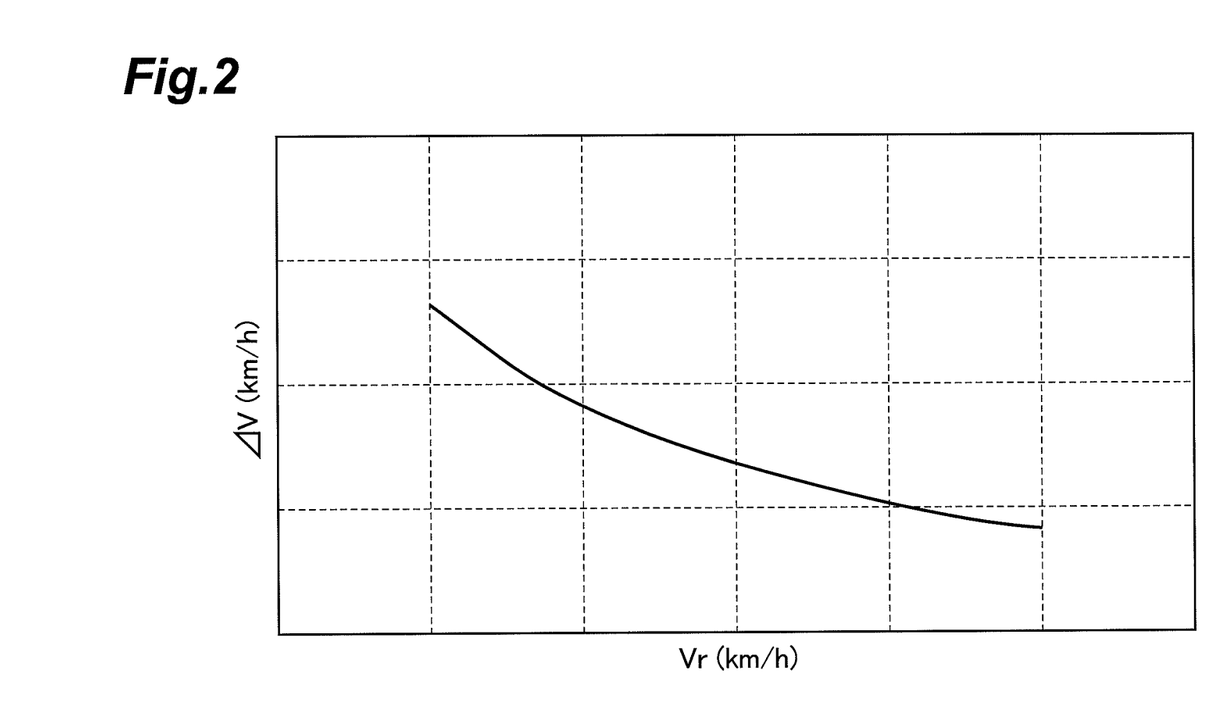
FIG. 2 is a graph illustrating the relationship between the relative velocity and a deceleration amount.

Thereby, the relationship between the relative velocity Vr and the deceleration amount ΔV is as shown in FIG. 2. As can be seen from FIG. 2, the deceleration amount ΔV becomes smaller as the relative velocity Vr increases.

Consequently, in the present embodiment, the same deceleration amount ΔV is obtained without depending on the relative velocity Vr and the deceleration amount ΔV. Similarly to the related art, assuming that the distance to the object in the operation of the brake is set to D and the timing of the brake operation is ahead by TTC to the collision, the following expression (1) is established.

[Formula 5]

$$D\ Vr \times TTC \qquad (1)$$

Similarly to the above, assuming that the acceleration a generated by a brake operation has a step response and the time to the collision is set to t, the following expression (2) is similarly established.

[Formula 6]

$$\frac{1}{2}at^2 + Vrt = D \qquad (2)$$

In the present embodiment, the expressions (1) and (2) are arranged for TTC. From the following expression (4), t is eliminated.

[Formula 7]

$$\Delta V = at \qquad (4)$$

Thereby, the following expression (5) is established.

[Formula 8]
$$TTC = \frac{\Delta V^2}{2aVr} + \frac{\Delta V}{a} \quad (5)$$

When the relative velocity Vr is equal to or lower than the preset deceleration amount $\Delta V$ as a target deceleration amount, the deceleration by an amount equivalent to the relative velocity Vr is sufficient, and thus the following expression (6) is obtained by making the relative velocity Vr equal to the deceleration amount $\Delta V$ in the expression (5).

[Formula 9]
$$\Delta V = -Vr \quad (6)$$
$$\therefore TTC = -\frac{Vr}{2a}$$

Figure 3:
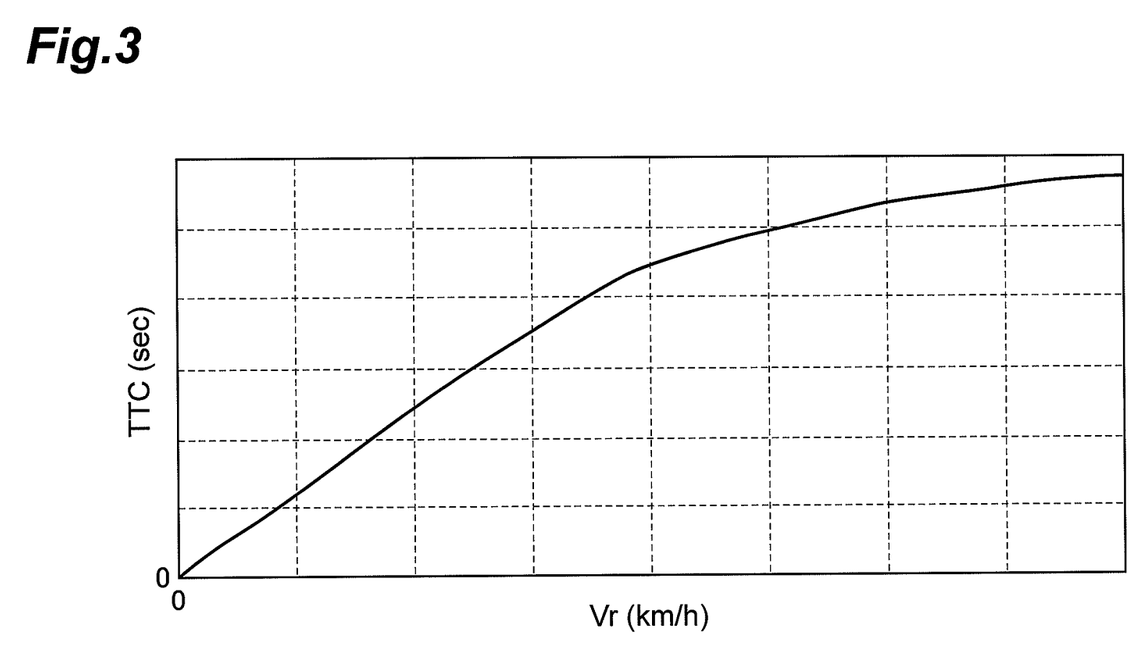
FIG. 3 is a graph illustrating the relationship between the relative velocity and TTC.

Here, the relationship between the relative velocity Vr and TTC is as shown in FIG. 3. In the range where the relative velocity Vr is lower than the set deceleration amount $\Delta V$, as shown in FIG. 3, let $\Delta V$ equal to Yr. Thereby, when the relative velocity Vr is low, it is possible to prevent an unnecessary deceleration from being performed.

In addition, when the object is, for example, a preceding vehicle and its acceleration and deceleration (deceleration when it has a negative value) is $a_T$, the following expressions (2'), (5') and (6') are established.

[Formula 10]
$$\frac{1}{2}(a - a_T)t^2 + Vrt = D \quad (2')$$

[Formula 11]
$$TTC = \frac{\Delta V^2}{2aVr}\left(1 - \frac{a_T}{a}\right) + \frac{\Delta V}{a} \quad (5')$$

[Formula 12]
$$TTC = -\frac{Vr}{2a}\left(\frac{a_T}{a} + 1\right) \quad (6')$$

Figure 4:
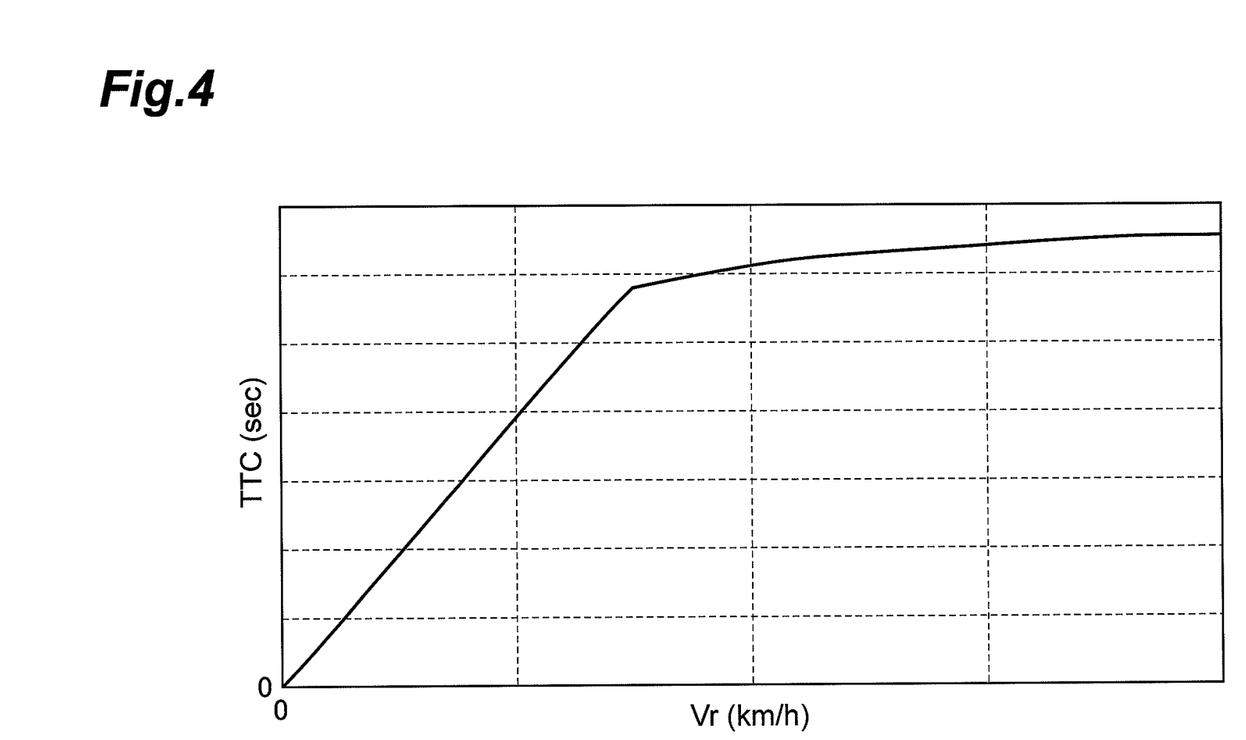
FIG. 4 is a graph illustrating the relationship between the relative velocity and TTC in a case where an obstacle is a preceding vehicle and the preceding vehicle moves according to an acceleration and a deceleration.

The relationship between the relative velocity Vr and TTC in a case where the preceding vehicle moves according to a variable velocity is as shown in FIG. 4.

Figure 5:
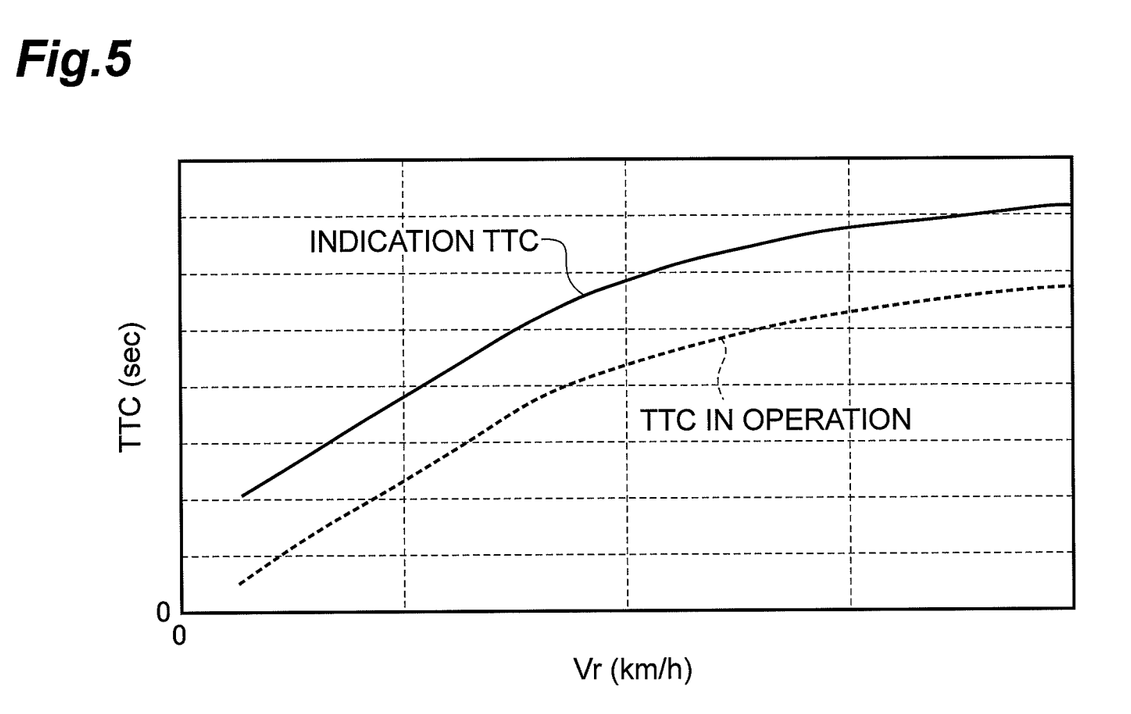
FIG. 5 is a graph illustrating the relationship between the relative velocity, TTC in operation and indication TTC in a case where an obstacle stops or moves at a constant velocity.
Figure 6:
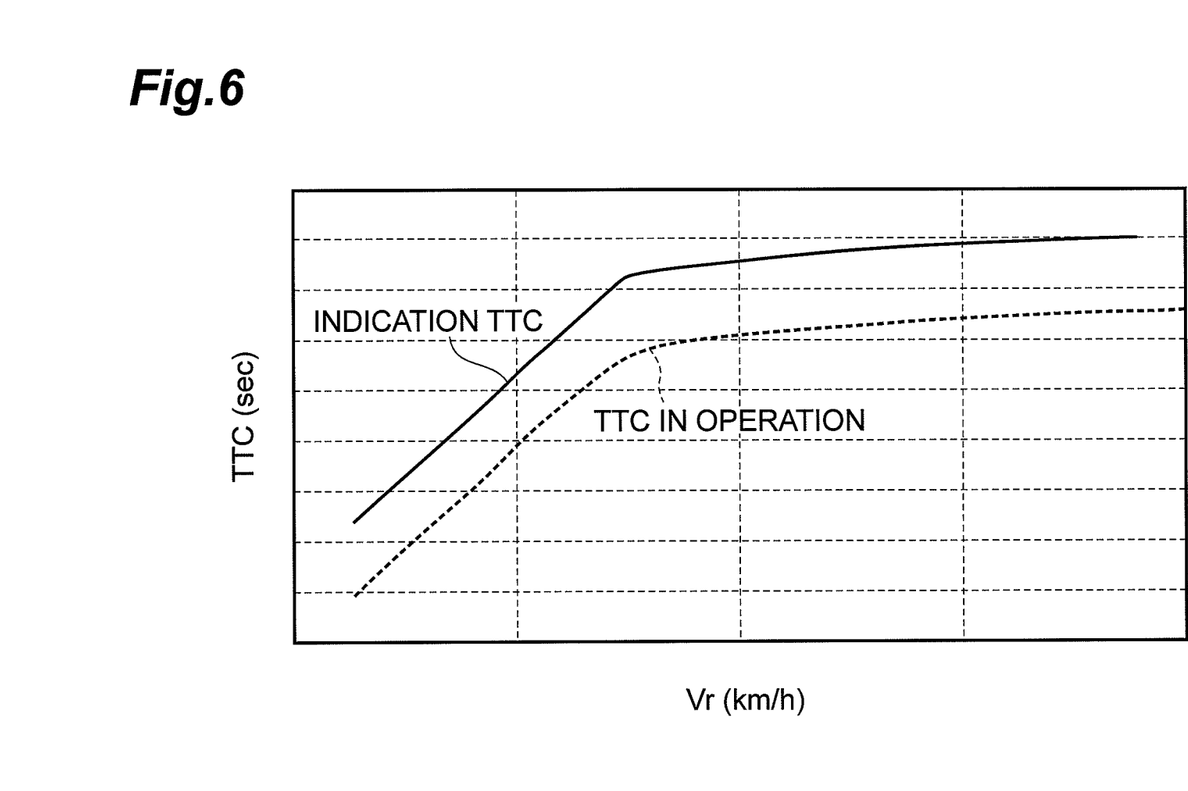
FIG. 6 is a graph illustrating the relationship between the relative velocity, TTC in operation and indication TTC in a case where an obstacle moves at an acceleration and a deceleration.

Thereby, the timing of the brake operation for obtaining the same deceleration amount (indication TTC) is as follows without depending on the relative velocity Vr and the deceleration a. That is, in consideration of the delay time in a vehicular system, it is necessary that the PCS ECU 20 issue an indication earlier than the operation TTC that is actually to be operated. Consequently, in consideration of the delay time, the relationship between the relative velocity Vr, TTC in operation and indication TTC in a case where the object stops or moves at a constant velocity is as shown in FIG. 5. In addition, the relationship between the relative velocity Vr, TTC in operation and indication TTC in a case where the object moves according to a deceleration is as shown in FIG. 6. Meanwhile, the deceleration generated by the brake operation may or may not be preset.

In the present embodiment, the PCS ECU 20 in the PCS system 10 calculates TTC which is a brake operation timing of the host vehicle, on the basis of the relative velocity Vr between the host vehicle and the object, the preset deceleration amount $\Delta V$ caused by the brake operation of the host vehicle, and the deceleration a caused by the brake operation of the host vehicle. Thereby, the deceleration amount $\Delta V$ caused by the brake operation of the host vehicle is to be a set constant amount regardless of the relative velocity Vr between the host vehicle and the object. Accordingly, it is possible to secure the deceleration amount $\Delta V$ caused by a more appropriate brake operation.

In addition, in the present embodiment, when the relative velocity Vr is equal to or lower than the predetermined deceleration amount $\Delta V$, the PCS ECU 20 calculates the brake operation timing of the host vehicle, on the basis of the relative velocity Vr and the deceleration a. Thereby, when the relative velocity Vr between the host and the object is equal to or lower than the set deceleration amount $\Delta V$ caused by the brake operation of the host vehicle, the deceleration of the host vehicle is accomplished by the deceleration a corresponding to that relative velocity amount Yr. Thereby, it is possible to suppress an unnecessary deceleration.

Further, in the present embodiment, PCS ECU 20 calculates the brake operation timing of the host vehicle, on the basis of the acceleration $a_T$ of the object. Thereby, it is possible to secure the deceleration amount $\Delta V$ caused by a more appropriate brake operation.

Further, in the present embodiment, the PCS ECU 20 calculates indication TTC which is a brake operation timing of the host vehicle, on the basis of a predetermined delay time in the system of the host vehicle. Thereby, it is possible to secure a more appropriate brake operation timing of the host vehicle and a deceleration amount $\Delta V$ caused by a more appropriate brake operation.

Hereinbefore, although the embodiment of the present invention has been described, the present invention is not limited to the above-mentioned embodiment and various changes and modifications can be made.

INDUSTRIAL APPLICABILITY

In accordance with the brake control device of the present invention, it is possible to secure a variation in velocity caused by a more appropriate brake operation.

REFERENCE SIGNS LIST

10: PCS system
12: laser radar
14: image sensor
20 PCS ECU
31: seat belt actuator
32: brake actuator
33: air bag actuator
34: engine ECU

The invention claimed is:
1. A brake control device comprising a brake operation timing calculating unit that calculates a timing of a brake operation of a host vehicle, on the basis of a time of collision TTC obtained from a formula including a relative velocity Vr between the host vehicle and an object, a preset variation in velocity $\Delta V$ caused by a brake operation of the host vehicle from start of the brake operation to finish of the brake operation, and a deceleration a caused by the brake operation of the host vehicle so that a variation in velocity caused by the brake operation of the host vehicle from start of the brake operation to finish of the brake operation is the preset variation in velocity ΔV, wherein the formula is:

$$TTC = \frac{\Delta V^2}{2aVr} + \frac{\Delta V}{a}.$$

2. The device according to claim 1, wherein when the relative velocity Vr is equal to or lower than the preset variation in velocity ΔV, the brake operation timing calculating unit calculates the timing of the brake operation of the host vehicle, on the basis of the relative velocity Vr and the deceleration a so that a variation in velocity caused by the brake operation of the host vehicle from start of the brake operation to finish of the brake operation is equal to the relative velocity Vr.

3. The device according to claim 1, wherein the brake operation timing calculating unit calculates the brake operation timing of the host vehicle, on the basis of an acceleration and a deceleration of the object.

4. The device according to claim 2, wherein the brake operation timing calculating unit calculates the brake operation timing of the host vehicle, on the basis of a variable velocity of the object.

5. The device according to claim 1, wherein the brake operation timing calculating unit calculates the brake operation timing of the host vehicle, on the basis of a predetermined delay time in a system of the host vehicle.

6. The device according to claim 2, wherein the brake operation timing calculating unit calculates the brake operation timing of the host vehicle, on the basis of a predetermined delay time in a system of the host vehicle.

7. The device according to claim 3, wherein the brake operation timing calculating unit calculates the brake operation timing of the host vehicle, on the basis of a predetermined delay time in a system of the host vehicle.

8. A brake control method comprising a brake operation timing calculating process of calculating a brake operation timing of a host vehicle, on the basis of a time to collision TTC obtained from a formula including a relative velocity Vr between the host vehicle and an object, a preset variation in velocity ΔV caused by a brake operation of the host vehicle from start of the brake operation to finish of the brake operation, and a deceleration a caused by the brake operation of the host vehicle so that a variation in velocity caused by the brake operation of the host vehicle from start of the brake operation to finish of the brake operation is the preset variation in velocity ΔV, wherein the formula is $$TTC = \frac{\Delta V^2}{2aVr} + \frac{\Delta V}{a}.$$

* * * * *